United States Patent [19]
Lai et al.

[11] Patent Number: 5,485,619
[45] Date of Patent: Jan. 16, 1996

[54] ARRAY VARIABLE TRANSFORMATION SYSTEM EMPLOYING SUBSCRIPT TABLE MAPPING TO SCALAR LOOP INDICES

[75] Inventors: Michael Lai; John L. Ng; Jin-Fan Shaw, all of San Jose, Calif.

[73] Assignee: International Business Machines Corporation, Armonk, N.Y.

[21] Appl. No.: 174,746

[22] Filed: Dec. 29, 1993

[51] Int. Cl.$^6$ .................... G06F 9/44; G06F 9/40
[52] U.S. Cl. .................... 395/700; 364/DIG. 1; 364/280.4; 364/280.5
[58] Field of Search .................... 395/700

[56] References Cited

U.S. PATENT DOCUMENTS

| | | | |
|---|---|---|---|
| 4,773,007 | 9/1988 | Kanada | 364/300 |
| 4,833,606 | 5/1989 | Iwasawa et al. | 364/300 |
| 4,858,115 | 8/1989 | Rusterholz et al. | 364/200 |
| 5,107,418 | 4/1992 | Cramer et al. | 395/700 |
| 5,109,331 | 4/1992 | Ishida et al. | 395/375 |
| 5,274,812 | 12/1993 | Inoue | 395/700 |
| 5,287,510 | 2/1994 | Hall et al. | 395/700 |
| 5,293,631 | 3/1994 | Rau et al. | 395/700 |

OTHER PUBLICATIONS

C. Houdhary, A., "Compiling FORTRAN 77D and 90D for MIMD distributed)—memory machines", 1992 Conference, IEEE Comp. Soc. Press.

*Primary Examiner*—Kevin A. Kriess
*Assistant Examiner*—St. John Courtenay, III
*Attorney, Agent, or Firm*—Baker, Maxham, Jester & Meador

[57] ABSTRACT

A subscript table mapping system for optimizing the compilation of certain Fortran 90 array construction and array manipulation transformation functions. The subscript table data object of this invention is used to perform the three compiler optimizations, including subscript dependency analysis, subscript table transformation and optimized code generation. Application of a simple subscript mapping function tailored to the particular intrinsic Fortran 90 array variable transformation function permits compilation of executable binary code that saves substantial processing steps and data storage space by avoiding during execution the usual requirement for temporary storage of abstract transformational array variables.

10 Claims, 7 Drawing Sheets

C(i,j,k):

|        | LOOP (i) | LOOP (j) | LOOP (k) |
|--------|----------|----------|----------|
| DIM 1  | 1        | 0        | 0        |
| DIM 2  | 0        | 1        | 0        |
| DIM 3  | 0        | 0        | 1        |

$$SUBSCRIPT\ TABLE\ ST_C = \begin{bmatrix} 1 & 0 & 0 \\ 0 & 1 & 0 \\ 0 & 0 & 1 \end{bmatrix}$$

|        | LOOP (i) | LOOP (j) |
|--------|----------|----------|
| DIM 1  | 1        | 0        |
| DIM 2  | 0        | 1        |

$$SUBSCRIPT\ TABLE\ ST_A = \begin{bmatrix} 1 & 0 \\ 0 & 1 \end{bmatrix}$$

|        | LOOP (i) |
|--------|----------|
| DIM 1  | 1        |

$$SUBSCRIPT\ TABLE\ ST_B = \begin{bmatrix} 1 \end{bmatrix}$$

| | | | |
|---|---|---|---|
| OLD LOOP | 1 | 2 | 3 |
| NEW LOOP | 1 | 2 | 3 |

SUBSCRIPT MAP $SM_C = [1\ 2\ 3]$

| | | |
|---|---|---|
| OLD LOOP | 1 | 2 |
| NEW LOOP | 1 | 2 |

SUBSCRIPT MAP $SM_A = [1\ 2\ 0]$

| | |
|---|---|
| OLD LOOP | 1 |
| NEW LOOP | 1 |

SUBSCRIPT MAP $SM_B = [1\ 0\ 0]$

*FIG. 5C*

SPREAD (A,DIM,NCOPIES)
SPREAD (A,2,100):
(INCREMENT LOOP ≥ DIM =2)

| OLD LOOP | 1 | 2 |
|---|---|---|
| NEW LOOP | 1 | 3 |

TRANSFORMED SUBSCRIPT MAP SM'$_A$ = [130]

FIG. 6A

SPREAD (B,DIM,NCOPIES)
SPREAD (B,2,100):
(INCREMENT LOOP ≥ DIM =2)

| OLD LOOP | 1 |
|---|---|
| NEW LOOP | 1 |

TRANSFORMED SUBSCRIPT MAP SM'$_B$ = [100]

FIG. 6B

SPREAD (B',DIM,NCOPIES)
SPREAD (SPREAD (B,2,100),1,100)
(INCREMENT LOOP ≥ DIM =1)

| OLD LOOP | 1 |
|---|---|
| NEW LOOP | 2 |

TRANSFORMED SUBSCRIPT MAP SM''$_B$ = [200]

FIG. 6C

ARRAY VARIABLE TRANSFORMATION SYSTEM EMPLOYING SUBSCRIPT TABLE MAPPING TO SCALAR LOOP INDICES

BACKGROUND OF THE INVENTION

1. Field of the Invention

This invention relates generally to a program compiler optimization method and particularly to a technique for generating efficient object code for intrinsic Fortran 90 array variable transformation functions.

2. Description of the Related Art

Recently, the X3J3 subcommittee of the American and National Standards Institute (ANSI), in collaboration with a corresponding International Standards Organization (ISO) group ISO/IEC JTC1/SC22/WG5, approved a new standard for the Fortran programming language. This new Fortran programming language standard is generally denominated the "Fortran 90" language standard and is also in the art denominated the "Fortran 90 Array" language standard. While maintaining compatibility with and providing support for the previous "FORTRAN 77" language standard, this new Fortran 90 Array language standard defines many new programming constructs and functions.

Among these new features are the "array language" protocols. Fortran programs in the Fortran 90 language may specify operations to be performed on entire arrays or on specific sections of arrays. To facilitate these new array operations, the Fortran 90 standard defines a new class of intrinsic array functions denominated "transformational functions". The Fortran 90 standard is promulgated by the ISO as the International Fortran Standard specification number ISO/IEC 1539:1991 and is promulgated by the ANSI as specification number ANSI X3.198-199x.

The new features promulgated in the Fortran 90 language standard create new challenges for existing Fortran compiler and preprocessor technology. The existing FORTRAN 77 compilers do not address the array transformational functions and must be completely rewritten and restructured to accommodate the Fortran 90 standard. The new problems created by Fortran 90 array constructs can be appreciated with reference to the FORTRAN compiler art.

FIG. 1 illustrates a procedure for translating a FORTRAN program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Lexical/syntax analysis routine 14 and code generation routine 22 are easily defined in terms of the Fortran 90 specification and the machine binary code set, respectively. Thus, it is optimization routine 18 that is primarily affected by the new Fortran 90 standard. Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Data-flow analysis routine 28 produces the data-flow data 30. Finally, a program transformation procedure 32 accepts control flow data 26, data-flow data 30 and first intermediate language program 16 to produce second intermediate language program 20.

Many methods for analyzing relationships between definitions and uses of variables and arrays are known in the art. For instance, in U.S. Pat. No. 4,773,007, Yasusi Kanada et al. disclose a program translation method for obtaining appropriate array definition and use relationships in a DO-loop that contains a conditional statement or control structure. Kanada et al. teach a process where data flow analysis procedure 28 checks for the presence of intra-loop changes to array variables before passing control to program transformation procedure 32. In their method, program transformation procedure 32 is executed only if the array definition/ use relationship data indicate that the elements of an array variable will be rewritten within a loop. Kanada et al. suggest comparing subscripts associated with the array definition and the array use to test this indication.

In U.S. Pat. No. 4,833,606, Kyoko Iwasawa et al. disclose a compiling method for vectorizing multiple DO-loops. Their method detects variables that are defined in one loop and referenced by another and maps the variable information into a dependency graph that is used to analyze data dependencies of each loop level. Iwasawa et al. disclose a compiler procedure that inserts control statements to assure preservation of initial and end values for the loops, thereby minimizing the size of the working (temporary) arrays. The object of this method is to make it possible to perform vector operations for an outer loop by transforming variables into arrays, permitting the variables having values defined in the outer loop to be used in the inner loop and also permitting these variables with values defined in the inner loop to be replaced by the arrays so that the vectorization process can be performed for the outer loop. Iwasawa et al. teach a method for detecting connected components linked together by an arc in a data dependency graph indicative of the sequence of definitions and use of variables in multiple loops.

Similarly, in U.S. Pat. No. 5,109,331, Kazuhisa Ishida et al. disclose a method for source program compilation by analyzing a subscript in an array variable included in a loop. They optimize program execution by employing an "induction variable" represented by a standard form expressed by an initial value in a first loop iteration and an increment value for each subsequent loop iteration. A subscript in a loop array is represented by linear coupling to the standard form. Subscript independency and dependency within the loop is tested during compilation. Basically, Ishida et al. search for identical array elements having different names and force them to the identical storage location in the executable binary code, thereby saving memory and processing steps.

Thus, practitioners in the art generally employ "subscript tables" during compilation of array variables. A subscript table is a data structure commonly employed in the optimization process 18 (FIG. 1) and consists of a two-dimensional array containing elements of type integer and pointers to expressions that collectively encode all of the information pertaining to the sub script expressions and their enclosing DO- loops. Practitioners in the compiler art have developed formal "dependency-analysis" procedures using constructs such as subscript tables to decompose nested DO-loops into parallel strings suitable for simultaneous execution in multiprocessor arrays.

For instance, Zhiyuan Li et al. ("Program Parallelization with Interprocedural Analysis", The Journal of Supercomputing, vol. 2, pp 225–44, Kluwer Academic Publishers, Boston, Mass., 1988) provide a useful general discussion of interprocedural analysis for parallel computing that introduces several useful formal concepts related to the use of sub script tables in dependency analysis. Li et al. examine several methods for interprocedural data dependency analysis, including "atom images". The atom images method is useful for resolving cases of difficult and inefficient data dependency.

Also, E. D. Kyriakis-Bitzaros et al. ("An Efficient Decomposition Technique for Mapping Nested Loops with Constant Dependencies into Regular Processor Arrays", Journal of Parallel and Distributed Computing, vol. 16, pp. 258–264, Academic Press, Inc., 1992) discuss a method for mapping nested loops with constant dependencies into distributed memory multiprocessors. Kyriakis-Bitzaros et al. discuss "loop index space", which is a concept used in compiler optimization that leads to improved binary code efficiency. They introduce the "Augmented Dependence Graph" (ADG) as a device for separating different variables having equal indices in multiple nested loop statements.

Despite extensive effort in the compiler art related to array variable and nested DO-loop optimization, the array transformation functions introduced by the new Fortran 90 standard bring with them new inefficiencies in storage and processing and there is an accordingly clearly-felt need in the art for more efficient compiling procedures suitable for application to these new intrinsic Fortran 90 array transformation functions.

This problem can be better understood by considering an example. The Fortran 90 standard specification of the SPREAD function is provided in TABLE 1 below and the Fortran 90 specification of the TRANSPOSE function is provided in TABLE 2 below.

TABLE I

13.13.101 SPREAD (SOURCE, DIM, NCOPIES)

Description. Replicates an array by adding a dimension. Broadcasts several copies of SOURCE along a specified dimension (as in forming a book from copies of a single page) and thus forms an array of rank one greater.
Class. Transformational function.
Arguments.
SOURCE      may be of any type. It may be scalar or array values÷. The rank of SOURCE must be less than 7.
DIM      must be scalar and of type integer with value in the range $1 \leq DIM\ ' n + 1$, where n is the rank of SOURCE.
NCOPIES      must be scalar and of type integer.
Result Type, Type Parameter, and Shape. The result is an array of the same type and type parameters as SOURCE and of rank n + 1, where n is the rank of SOURCE.
Case (i):      If SOURCE is scalar, the shape of the result is (MAX, (NCOPIES, 0)).
Case (ii):      If SOURCE is array valued with shape $(d_1, d_2, \ldots, d_n)$, the shape is $(d_1, d_2, \ldots, d_{DIM-1},$ MAX (NCOPIES, 0), $d_{DIM}, \ldots, d_n)$.
Result Value.
Case (i):      If SOURCE is scalar, each element of the result has a value equal to SOURCE.
Case (ii):      If SOURCE is array valued, the element of the result with subscripts $(r_1, r_2, \ldots, r_{n+1})$ has the value source $(r_1, r_2, \ldots, r_{DIM-1}, r_{DIM+1}, \ldots, r_{n+1})$.

Example. If A is the array [2, 3, 4], SPREAD (A, DIM = 1, NCOPIES = NC) is the array $\begin{bmatrix} 2 & 3 & 4 \\ 2 & 3 & 4 \\ 2 & 3 & 4 \end{bmatrix}$ if NC has the value 3 and is a zero-sized array of NC has the value 0.

TABLE 2

13.13.109 TRANSPOSE (MATRIX)

Description. Transpose an array of rank two.
Class. Transformational function.
Argument. MATRIX may be of any type and must have rank two.
Result type, Type Parameters, and Shape. The result is an array of the same type and type parameters as MATRIX and with rank two and shape (n, m) where (m, n) is the shape of MATRIX.
Result Value. Element (i, j) of the result has the value MATRIX (j, i) = 1, 2, ..., n; j = 1, 2, ..., m.

Example. If $A$ is the array $\begin{bmatrix} 1 & 2 & 3 \\ 4 & 5 & 6 \\ 7 & 8 & 9 \end{bmatrix}$, then TRANSPOSE ($A$) has the value $\begin{bmatrix} 1 & 4 & 7 \\ 2 & 5 & 8 \\ 3 & 6 & 9 \end{bmatrix}$.

Consider the following exemplary Fortran 90 program.

```
REAL A(100,100),B(100),C(100,100,100)
C    =   SPREAD(A,2,100) +
         SPREAD(SPREAD(B,2,100),1,100)
END
```

Examination of the semantics of the SPREAD function in TABLE 1 suggest the Fortran 90 program translation provided below in TABLE 3.

TABLE 3

```
REAL A(100, 100), B(100), C(100, 100, 100)
integer new_loop_1
integer new_loop_2
integer new_loop_3
real temporary_array_1(100, 100, 100)
real temporary_array_2(100, 100)
real temporary_array_3(100, 100, 100)
do new_loop_3 = 1,100
    do new_loop_2 = 1,100
        do new_loop_1 = 1,100
            temporary_array_1
            (new_loop_1, new_loop_2, new_loop_3) =
*           A(new_loop_1, new_loop_3)
        enddo
    enddo
enddo
do new_loop_2 = 1,100
    do new_loop_1 = 1,100
        temporary_array_2
        (new_loop_1, new_loop_2) = B(new_loop_1)
    enddo
enddo
do new_loop_3 = 1,100
    do new_loop_2 = 1,100
        do new_loop_1 = 1,100
            temporary_array_3
            (new_loop_1, new_loop_2, new_loop_3) =
*               temporary_array_2(new_loop_2, new_loop_3)
        enddo
    enddo
enddo
do new_loop_3 = 1,100
```

TABLE 3-continued

```
    do new_loop_2 = 1,100
        do new_loop_1 = 1,100
            C(new_loop_1, new_loop_2, new_loop_3) =
*               temporary_array_1
                (new_loop_1, new_loop_2, new_loop_3) +
*               temporary_array_3
                (new_loop_1, new_loop_2, new_loop_3)
        enddo
    enddo
enddo
END
```

The intermediate program in TABLE 3 contains a total of 11 DO-loops herein denominated "scalarized loops". Note that three temporary arrays, occupying 2,010,000 storage elements, are created by the scalarizing translation process. The translation approach leading to the program in TABLE 3, although easy for the Scalarizer component of a compiler or preprocessor, is intolerably efficient at execution time in both storage space and execution steps. Nevertheless, this approach is the only translation approach known in the art for the new SPREAD function introduced by the Fortran 90 standard. Similar problems are known for the usual translation procedures applied to the TRANSPOSE function shown above in TABLE 2 as well as the CSHIFT function specified below in TABLE 4 and the EOSHIFT function specified below in TABLE 5.

TABLE 4

13.13.25 CSHIFT (ARRAY, SHIFT, DIM)

Optional Argument. DIM
Description. Perform a circular shift on an array expression of rank one or perform circular shifts on all the complete rank one sections along a given dimension of an array expression of rank two or greater. Elements shifted out at one end of a section are shifted in at the other end. Different sections may be shifted by different amounts and in different directions.
Class. Transformational function.
Arguments.
ARRAY       may be of any type. It must not be scalar.
SHIFT       must be of type integer and must be scalar if ARRAY has rank one;

TABLE 4-continued

13.13.25 CSHIFT (ARRAY, SHIFT, DIM)

|  |  |
|---|---|
|  | otherwise, it must be scalar or of rank n − 1 and of shape $(d_1, d_2, \ldots, d_{DIM-1}, d_{DIM+1}, \ldots, d_n)$ where $(d_1, d_2, \ldots, d_n)$ is the shape of ARRAY. |
| DIM (optional) | must be a scalar and of type integer with a value in the range $1 \leq DIM \leq n$, where n is the rank of ARRAY. If DIM is omitted, it is as if it were present with the value 1. |

Result Type, Type parameter, and Shape. The result is of the type and type parameters of ARRAY, and has the shape of ARRAY.

Result Value.

| | |
|---|---|
| Case (i): | If ARRAY has rank one, element i of the result is ARRAY (1 + MODULO (i +SHIFT − 1, SIZE (ARRAY))). |
| Case (ii): | If ARRAY has rank greater than one, section $(s_1, s_2, \ldots, s_{DIM-1}, :, s_{DIM+1}, \ldots, s_n)$ of the result has a value equal to CSHIFT (ARRAY $(s_1, s_2, \ldots, s_{DIM-1}, :, s_{DIM+1}, \ldots, s_n)$, 1, sh), where sh is SHIFT or SHIFT $(s_1, s_2, \ldots, s_{DIM-1}, s_{DIM+1}, \ldots, s_n)$. |

Examples.

| | |
|---|---|
| Case (i): | If V is the array [1, 2, 3, 4, 5, 6], the effect of shifting V circularly to the left by two positions is achieved by CSHIFT (V, SHIFT = 2) which has the value [3, 4, 5, 6, 1, 2]; CSHIFT (V, SHIFT = −2) achieves a circular shift to the right by two positions and has the value (5, 6, 1, 2, 3, 4]. |
| Case (ii): | The rows of an array of rank two may all be shifted by the same amount or by different amount. If $M$ is the array $\begin{bmatrix} 1 & 2 & 3 \\ 4 & 5 & 6 \\ 7 & 8 & 9 \end{bmatrix}$, the value of $CSHIFT(M, SHIFT = -1, DIM = 2)$ is $\begin{bmatrix} 3 & 1 & 2 \\ 6 & 4 & 5 \\ 9 & 7 & 8 \end{bmatrix}$, and the value of $CSHIFT (M, SHIFT = (/-1, 1, 0/), DIM = 2)$ is $\begin{bmatrix} 3 & 1 & 2 \\ 5 & 6 & 4 \\ 7 & 8 & 9 \end{bmatrix}$. |

TABLE 5

13.13.32 EOSHIFT (ARRAY, SHIFT, BOUNDARY, DIM)

Optional Argument. BOUNDARY, DIM
Description. Perform an end-off shift on an array expression of rank one or perform
end-off shifts on all the complete rank-one sections along a given dimensions of an
array expression of rank two or greater. Elements are shifted off at one end of a sections
and copies of a boundary value are shifted in at the other end. Different sections may have
different boundary values and may be shifted by different amounts and in different directions.
Class. Transformational function.
Arguments.

ARRAY      may be of any type. It must not ne scalar.
SHIFT      must be of type integer and must be scalar if ARRAY has rank one; otherwise, it
must be scalar or fo rank n − 1 and of shape $(d_1, d_2, \ldots, d_{DIM-1}, d_{DIM+1}, \ldots, d_n)$ where $(d_1, d_2, \ldots, d_n)$ is the shape of ARRAY.

BOUND-
ARY
(optional)
     must be of the same type and type parameters as ARRAY and must be scalar if
ARRAY has rank one; otherwise it must be either scalar or of rank n − 1
and of shape $(d_1, d_2, \ldots, d_{DIM-1}, d_{DIM+1}, \ldots, d_n)$. BOUNDARY may be omitted for the data types in the following
table end, in this case, it is as if it were present with the scalar value
shown.

| Type of ARRAY | Value of BOUNDARY |
|---|---|
| Integer | 0 |
| Real | 0.0 |
| Complex | (0.0, 0.0) |
| Logical | false |
| Character (len) | len blanks |

DIM (optional)
     must be scalar and of type integer with a value in the
range $\leq$ DIM $\leq$ n, where n is the rank
of ARRAY. If DIM is omitted, it is as if it were present with the value 1.
Result Type, Type Parameter, and Shape. The result has the type, type parameters, and shape of
ARRAY.
Result Value. Element $(s_1, s_2, \ldots, s_n)$ of the result has the value ARRAY $(s_1, s_2, \ldots, s_n)$
of the result has the value ARRAY $(s_1, s_2, \ldots, s_{DIM-1}, s_{DIM} + sh, s_{DIM+1}, \ldots, s_n)$
where sh is SHIFT or SHIFT $(s_1, s_2, \ldots, s_{DIM-1}, s_{DIM+1}, \ldots, s_n)$ provided the
inequality LBOUND (ARRAY, DIM) $\leq s_{DIM} + sh \leq$ UBOUND (ARRAY, DIM) holds and is
otherwise BOUNDARY or BOUNDARY $(s_1, s_2, \ldots, s_{DIM-1}, s_{DIM+1}, \ldots, s_n)$.
Examples.

Case (i):      If V is the array [1, 2, 3, 4, 5, 6], the effect of shifting V end-off to the left by 3
positions is achieved by EOSHIFT (V, SHIFT = 3) which has the value [4, 5,
6, 0, 0, 0]; EOSHIFT (V, SHIFT = −2, boundary = 99) achieves and
end-off shift to the right by 2 positions with the boundary value of 99 and has
the value [99, 9, 1, 2, 3, 4].

Case (ii):      The rows of an array of rank two may all be shifted by the same amount or by
different amounts and the boundary elements can be the same or different. If M
is the array $\begin{bmatrix} A & B & C \\ D & E & F \\ G & H & I \end{bmatrix}$, then the value of $EOSHIFT$ (M, SHIFT = −1, BOUNDARY =

'*', DIM = 2) is $\begin{bmatrix} * & A & B \\ * & D & E \\ * & G & H \end{bmatrix}$, and the values of $EOSHIFT$ (M, SHIFT = (/ −1, 1, 0/), BOUNDARY = (/'*', '/', '?'/), DIM = 2) is $\begin{bmatrix} * & A & B \\ E & F & / \\ G & H & I \end{bmatrix}$.

The millions of steps and millions of temporary storage elements required for the relatively simple application of the Fortran 90 SPREAD function discussed above in connection with TABLE 3 suggest that there is a clearly-felt need in the art for improved optimization procedures for the intrinsic Fortran 90 array transformational functions. The related unresolved problems and deficiencies are clearly felt in the art and are solved by this invention in the manner described below.

SUMMARY OF THE INVENTION

This invention eliminates the processing and storage inefficiencies of the compiled array functions by extending the Subscript Table (ST) dependency analysis techniques with a new Subscript Mapping (SM) transform to restructure loop scalarizing procedures during compiler optimization processing. The essential object of this invention is to transform the ST from the beginning array state to the ultimate array state without the explicit intermediate temporary array storage steps normally required in the art. This invention arises from the unexpectedly advantageous discovery that the new Fortran 90 array transformations each remap the storage of array elements from an actual (source) to a final (object) array by way of one or more abstract (temporary) arrays. It is an advantageous feature of this invention that a new SM transformation is introduced to convert the initial ST to a final ST without actually materializing the intermediate (abstract) array distributions.

It is yet another advantage of this invention that the remapping of the array Subscript Tables is no longer treated as an actual data transfer operation, thereby eliminating the storage space requirement for temporary (abstract) arrays during execution.

The foregoing, together with other objects, features and advantages of this invention, will become more apparent when referring to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, wherein:

FIGS. 4A–4C provide exemplary Subscript Tables for an illustrative array variable transformation example;

FIGS. 5A–5C provide the Subscript Maps for the array variable transformation example of FIGS. 4A–4C;

FIGS. 6A–6C provide the transformed Subscript Maps for the array variable transformation example of FIGS. 4A–4C.

DETAILED DESCRIPTION OF THE PREFERRED EMBODIMENTS

Figure 1:
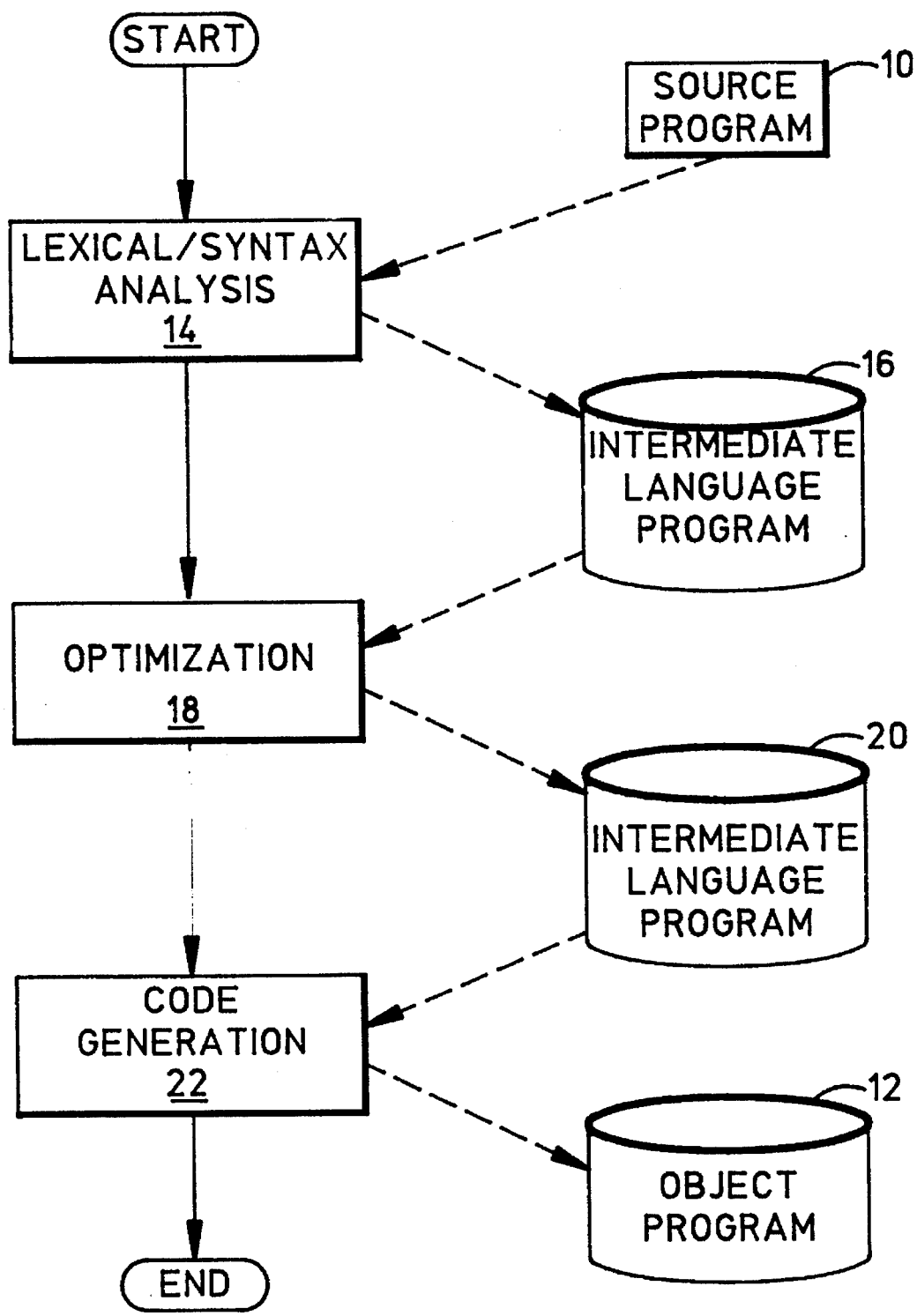
FIG. 1 shows a functional block diagram of an exemplary compiling method from the prior art.
Figure 2:
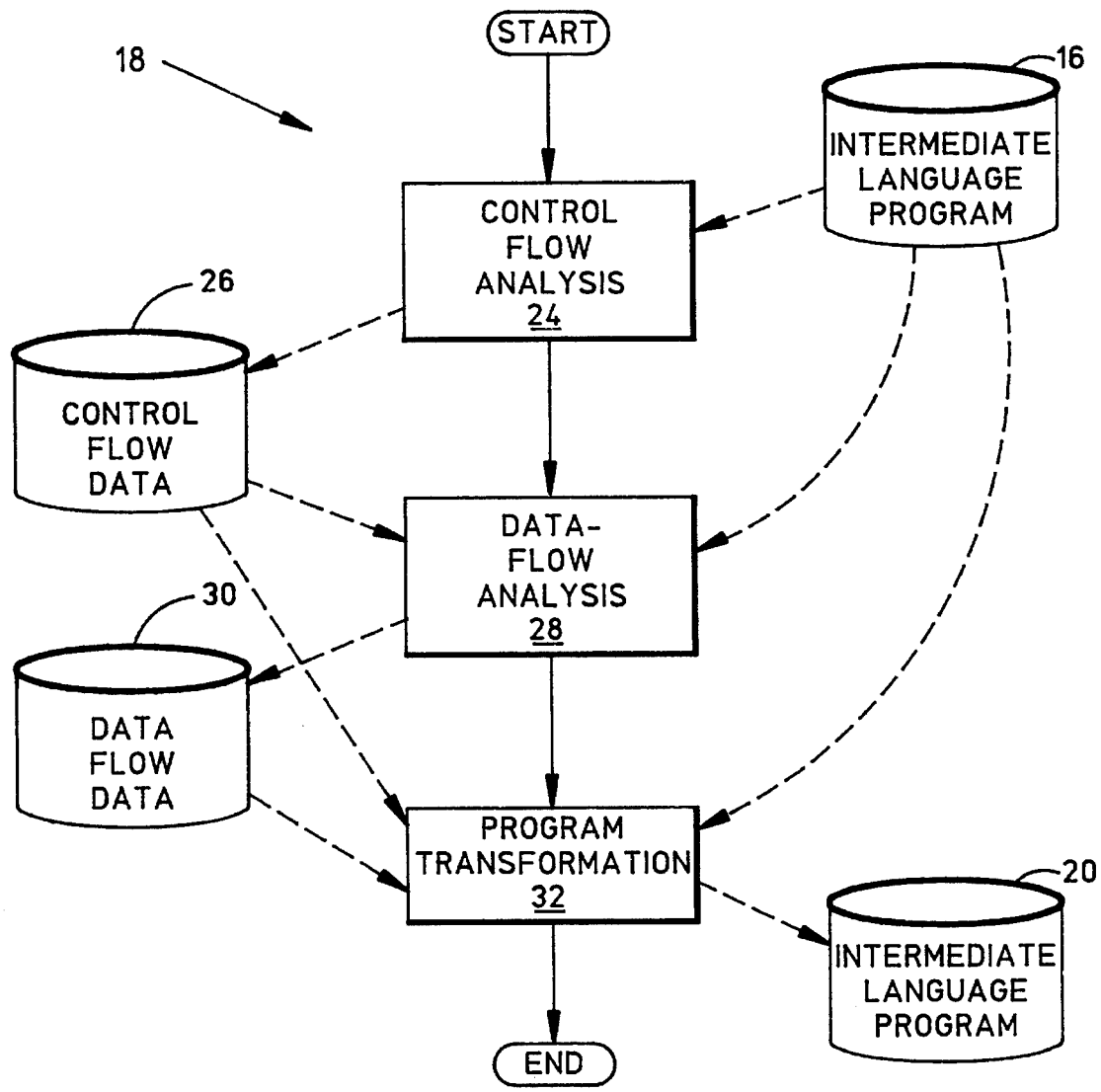
FIG. 2 shows a functional block diagram of an exemplary compiling optimization method from the prior art.

The method of this invention extends the use of subscript tables in the processing of Fortran 90 transformational functions. As discussed above, a subscript table (ST) is a data structure commonly used in the traditional optimizing Fortran compiler/preprocessor. STs are two-dimensional arrays consisting of elements of type integer and pointers to expressions that collectively encode all of the information pertaining to subscript expressions and their enclosing DO-loops. A subscript expression may be reconstructed in its enclosing DO-loops from the ST.

For example, consider the following exemplary Fortran 90 program, which was discussed above in connection with TABLE 3.

FIG. 4A provides a subscript table $ST_c$ that describes the subscript expression C from this program example. The reference to the array variable C in this Fortran 90 program example is equivalent to a reference to C(i,j,k) where the three array sections correspond to three enclosing DO-loops in accordance with the mapping specified by $ST_c$ in FIG. 4A.

Similarly, FIG. 4B provides a subscript table $ST_A$ that describes the array variable A in the above program example. Note that the first two DO-loops in subscript table $ST_A$ correspond to the two array sections in A(i,j) as shown. Similarly, FIG. 4C provides a subscript table $ST_B$ that defines the equivalency between the enclosing DO-loops and the single array section in array variable B.

An important feature of this invention is that the STs illustrated in FIGS. 4A–4C can be extended to incorporate the processing of the Fortran 90 Array Construction and Array Manipulation transformation functions. This concept arises from the unexpectedly advantageous observation that certain Array Construction (such as SPREAD) and Array Manipulation (such as TRANSPOSE) transformational functions merely remap the storage of array elements from an actual array variable to an abstract array. That is, the subscript expressions appearing in the abstract array are expressible as functions of those appearing in the original array. These functions of this invention are herein denominated "subscript maps (SM's)".

With this observation, the traditional method for processing these classes of transformational functions, discussed above in connection with TABLE 3, can be reinterpreted as the "materialization" and storage of the "abstract" arrays. Such reinterpretation also, for the first time, explains why the traditionally-generated code for these classes of transformational functions is so inefficient in time and space requirements; that is, the traditional method does not consider or suggest any advantages arising from remapping of these array elements but instead uniformly processes such remapping as real data transfer operations.

The key element of the method of this invention arises from the unexpected discovery that this concept of remapping can be formulated and simply encoded in the STs. The inventors herein introduce the concept of a SM that maps the original scalarized loop numbers directly to a set of final Fortran 90 scalarized DO-loop numbers.

The procedure of this invention is now described. For every scalarized loop in a ST (e.g., FIGS. 4A–4C), there may be defined a new function herein denominated the "Subscript Map (SM)", which maps the scalarized loop number into the (still abstract) final Fortran 90 scalarized DO-loop number. For example, consider FIGS. 5A–5C. FIG. 5A specifies a Subscript Map $SM_c$ that maps the old scalarized loops into the new Fortran 90 DO-loops for the array variable C from the above program example. FIGS. 5B–5C provide Subscript Maps $SM_A$ and $SM_B$, which similarly map old loop numbers to new DO-loop numbers for the array variables A and B from the above program example. The preferred mapping relationship is simply the identity function $\mathcal{J}$; that is, every scalarized loop number in the subscript table is mapped to the same Fortran 90 final DO-loop number. The identity function $\mathcal{J}$ is chosen for convenience and the method of this invention does not require any particular mapping function.

As the Array Construction and Array Manipulation transformational functions are processed, the subscript maps from FIGS. 5A–5C are revised according to a simple, predefined mapping rule derived from the definition of the particular Fortran 90 transformational function. Thus, the SPREAD function gives rise to one predefined mapping rule and the TRANSPOSE function gives rise to another. For instance, to process the SPREAD function, the corresponding predetermined mapping rule requires that all SM elements greater than or equal to the SPREAD function dimension (the DIM parameter) must be incremented by one. This can be understood with reference to FIGS. 6A–6C for the above program example.

In FIG. 6A, the SPREAD (A, 2, 100) construct is found to require the second element of $SM_A$ to be incremented because it is equal to or greater than DIM=2. In FIG. 6B, no element of $SM_B$ is equal to or greater than DIM=2 so there is no change to the subscript map for SPREAD (B, 2, 100). Finally, in FIG. 6C, the single SM element is incremented because it is equal to or greater than DIM=1 for the compound function SPREAD (SPREAD (B, 2, 100), 1, 100).

Note that these SM transformations are accomplished without the materialization of abstract arrays into temporary storage and without changes to the original STs (FIGS. 4A–4C). The results of the SM transformations imposed by the predetermined mapping rule for the SPREAD operations in the above program example are shown as the transformed subscript maps $SM'_A$ and $SM'_B$ in FIGS. 6A–6C.

These transformed SMs next employed to transform the STs discussed above in connection with FIGS. 4A–4C into new STs suitable for use in generating the final object code. The combination of new SMs with old STs to create new STs is summarized below.

$$C: ST_C = \begin{bmatrix} 1 & 0 & 0 \\ 0 & 1 & 0 \\ 0 & 0 & 1 \end{bmatrix}$$

$$SPREAD(A,2,100): ST'_A = SM'_A(ST_A) = \begin{bmatrix} 1 & 0 & 0 \\ 0 & 0 & 1 \end{bmatrix}$$

$$SPREAD(SPREAD(B,2,100)1,100): ST'_B = SM'_B(ST_B) = [0\ 1\ 0]$$

From the above, the final translated code generation may be simply written as follows in TABLE 6 below.

TABLE 6

```
REAL A(100, 100), B(100), C(100, 100, 100)
integer new_loop_1
integer new_loop_2
integer new_loop_3
do new_loop_3 = 1,100
    do new_loop_2 = 1,100
        do new_loop_1 = 1,100
            C(new_loop_1, new_loop_2, new_loop_3)
    *           A(new_loop_1,
                new_loop_3) + B(new_loop_2)
        enddo
    enddo
enddo
END
```

Comparing TABLE 6 to TABLE 3 above, note that the procedure in TABLE 6 requires only three DO-loops instead of eleven, saving millions of instruction executions as well as saving 2,010,000 elements of temporary storage during binary code execution. In general, no temporary array storage is required with the mapping transform compilation method of this invention.

The method of this invention for processing the Fortran 90 Array Construction and Array Manipulation transformational functions using subscript tables and subscript mapping functions can be generalized to functions other than the SPREAD function discussed above. In all such cases, the STs, together with the predetermined subscript mapping rules defining the SMs, provide a compact, centralized, effective and efficient means for processing such functions by capturing the essence of the remapping of array element storage from actual abstract array in the form of a SM.

The predetermined mapping rule for the SPREAD function can be formally written as follows:

For $1 \leq i \leq N$;  $SM'(i) = SM(i) + 1$  if $SM(i) \geq DIM$ $SM'(i) = SM(i)$  otherwise The predetermined mapping rule for the TRANSPOSE function can be formally written as:

$SM'(1) = SM(2)$ $SM'(2) = SM(1)$

Mapping rules for other Array Manipulation transformational functions such as CSHIFT and EOSHIFT can be similarly defined. For example, if the shift value is S, then the resulting subscript expression for DIM can generally be computed by incrementing the value of the Fortran 90 DO-loop variable corresponding to SM(DIM) by S. Some minor exceptions to this rule exist near the boundaries of the array variable being shifted, where the SMs must be specially defined to conform with the particular semantics of the CSHIFT and EOSHIFT functions.

Loop interchange or loop reversal operations can sometimes be applied to improve code efficiency by avoiding the use of temporary arrays. When using either loop interchange or reversal, the subscript tables are transformed accordingly to reflect the new sub script values.

Figure 3:
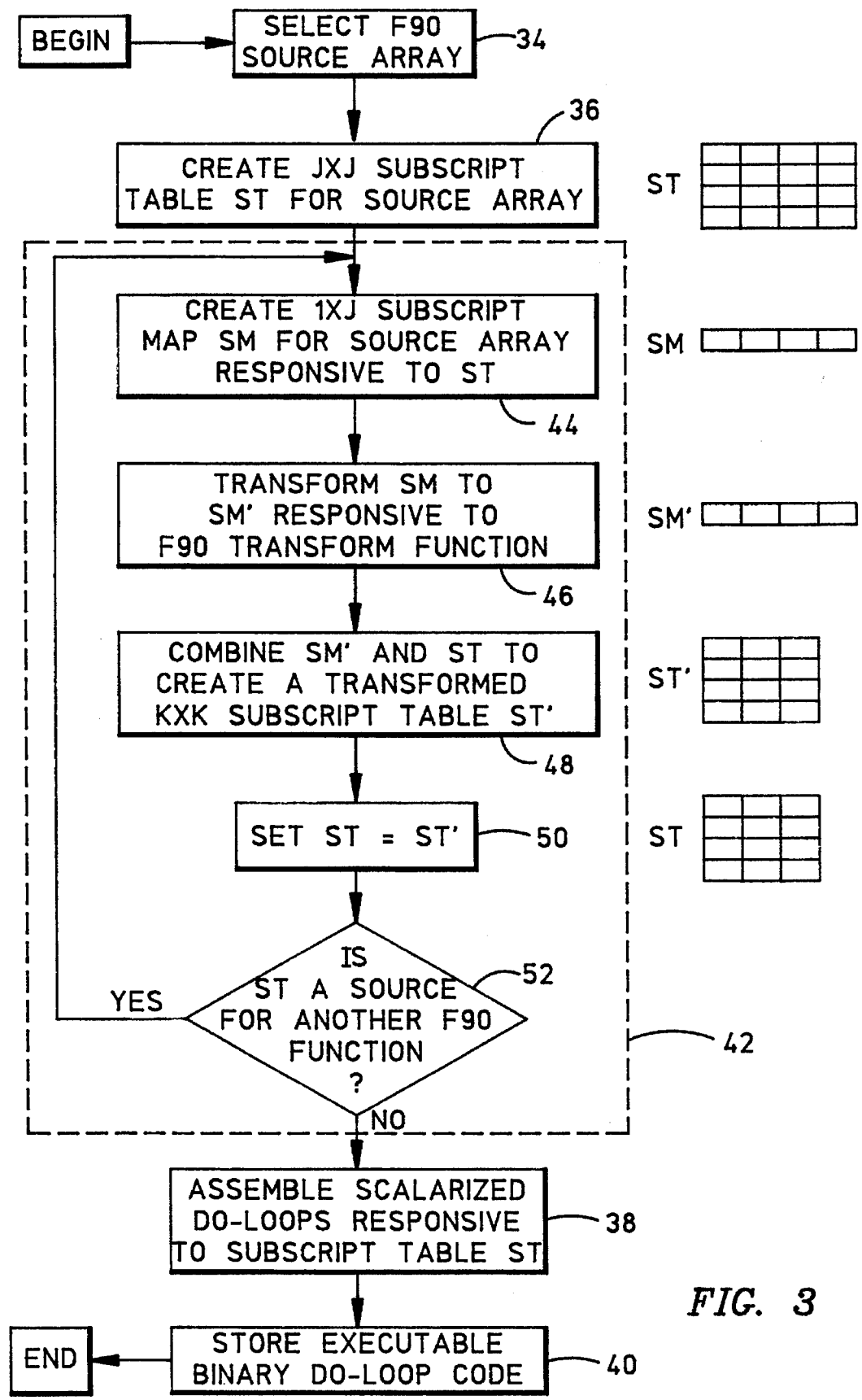
FIG. 3 shows a functional block diagram of the Subscript Table mapping transformation method of this invention.

FIG. 3 provides a functional block diagram of an illustrative embodiment of the processing method of this invention. After beginning, the first source array variable (e.g., A in the above-discussed example) is selected in a selection step 34 and a J by J Subscript Table ST is generated using, preferably, the identity function $\mathcal{J}$ in a ST creation step 36.

Without the method of this invention, the method of the existing art would then proceed directly to step 38 where the Subscript Table is immediately used to generate the scalarized DO-loops necessary to load the abstract arrays to temporary storage and therefrom to step 40 for the generation and storage of the binary code. However, with the method of this invention, several additional steps are provided in procedure 42 as shown in FIG. 3.

The first step of procedure 42 is the creation of a 1 by J subscript map SM for the selected source array variable in creation step 44. Subscript map SM is preferably generated by the identity function $\mathcal{J}$ from Subscript Table ST but may be created by another useful transformational function. After creation, Subscript Map SM is then transformed to SM' in accordance with the predetermined mapping rule corresponding to the particular Fortran 90 transformation function being decoded at step 46. Finally, in step 48, the transformed Subscript Map SM' and the original Subscript Table ST are combined to create a transformed K by K Subscript Table ST'. The last two steps 50 and 52 illustrate the situation where the Fortran 90 transformational functions are nested one within the other, such as is the case in the above program example. First, the transformed Subscript Table ST' is renamed and then steps 44–48 are repeated for the exterior transformation function, assuming the interior function to be an array variable represented by ST=ST'.

Figure 7:
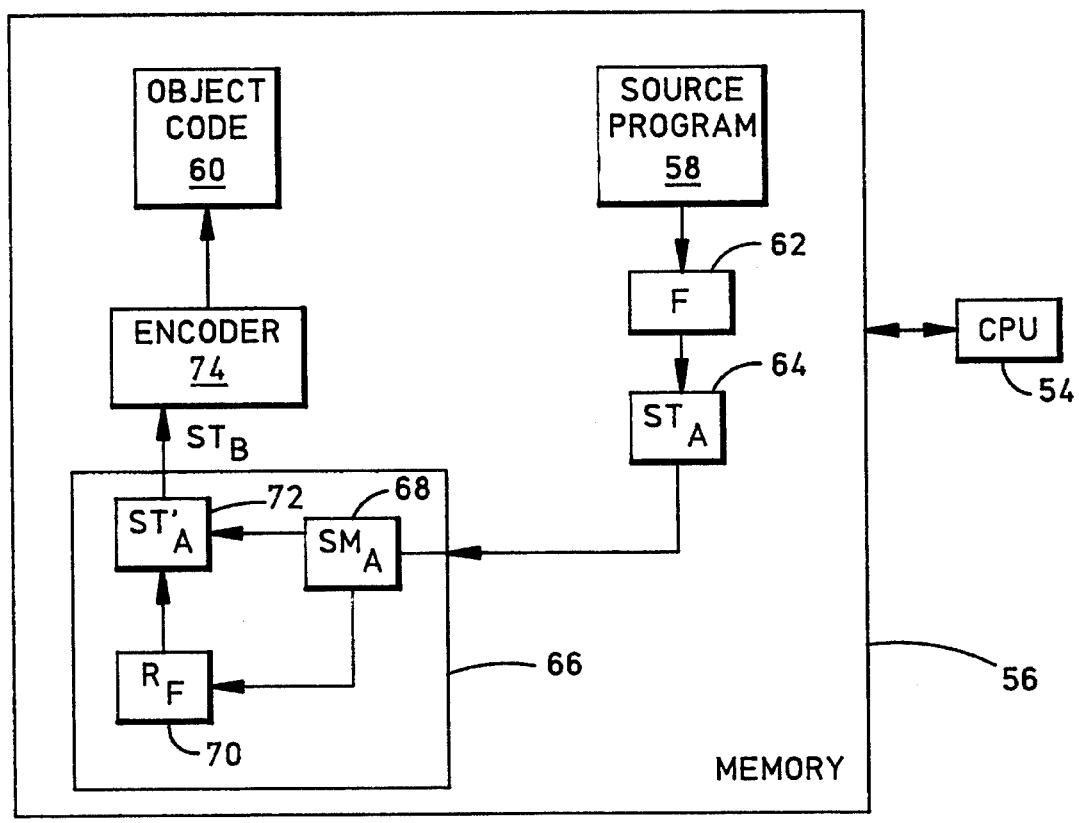
FIG. 7 shows a functional block diagram of an exemplary embodiment of the compiling system of this invention.

FIG. 7 provides a simple functional block diagram of a compiling system organized to operate in accordance with the method of this invention. A Central Processing Unit (CPU) 54 is coupled to a memory 56 in the usual manner. Within the memory 56 are several objects, including a source program object 58, the code object 60 and several objects associated with the method of this invention. Source program 58 is coupled to a parsing object 62, which recognizes the particular Fortran 90 transformational function F and provides necessary information to a scalarizing object 64. Scalarizing object 64 generates the Subscript Table (ST) discussed above.

A transforming object 66 converts the initial Subscript Table $ST_A$ into a final Subscript Table $ST_B$ representing the final scalarized DO-loop such as shown above in TABLE 6. Within transforming object 66 are a mapping object 68, which generates the Subscript Map $SM_A$, preferably by application of the identity function $\mathscr{J}$ to Subscript Table $ST_A$ from object 64. Object 70 provides the predetermined mapping rule RF associated with the function F identified in parsing object 62. Combining object 72 applies the predetermined mapping rule RF from object 70 to the $SM_A$ from object 68 to provide a transformed Subscript Map $ST'_A$, which is then employed to transform the $ST_A$ from object 64 into $ST'_A$, which is equivalent to the finally desired Subscript Table $ST_B$.

Final Subscript Table $ST_B$ from transforming object 66 is then provided to the encoder object 74, which generates the final scalarized DO-loops in the binary executable code required for object code 60.

The inventors conducted experiments designed to compare performance of the compiling method of this invention with the existing art. One such experiment used the following Fortran 90 program:

```
REAL C(10,50),x(10,10000),DCX2(50,10000)
DCX2   =   SUM((SPREAD(X,2,50) –
              SPREAD(C,3,10000))**2,1)
END
```

The results of the measurements performed on an IBM RASC/System 6000 Model 540 are provided in TABLE 7 below.

TABLE 7

| Compiler Used | User CPU Execution Time |
| --- | --- |
| NAGware f90 | 43.38 sec |
| IBM xlf (VAST-2) | 3.87 sec |
| This Invention | 1.80 sec |

Although subscript tables are traditionally limited to data dependency analysis, the subscript mapping extension described herein permits subscript tables to be substantially extended to include the important loop restructuring techniques such as loop reversal and loop interchange. Also, traditional data dependency analysis may be refined with this technique to consider the special roles assumed by the scalarized loops, resulting in improved data dependence and analysis accuracy.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A computer-implemented method for translating an array variable function F in a source program to obtain executable object code, said array variable function F providing in one or more enclosing DO-loops the transformation of a first array variable A having one or more subscripts $\{a_i\}$ into a second array variable B=F(A) having one or more subscripts $\{b_i\}$, wherein i is a non-zero positive integer, said method comprising the steps of:

creating a subscript table $ST_A$ relating said subscripts $\{a_i\}$ to said enclosing DO-loops for said first array variable A;

(b) transforming said subscript table $ST_A$ according to a first transform operator to create a subscript map $SM_A$ relating an enclosing DO-loops to a plurality of final scalarized DO-loops;

(c) transforming said subscript map $SM_A$ according to a mapping rule $R_F$ to create a new subscript map $SM'_A$; and (d) combining said new subscript map $SM'_A$ and said subscript table $ST_A$ to create a new subscript table $ST'_A$ relating said subscripts $\{a_i\}$ to said plurality of final scalarized DO-loops, wherein said new subscript table $ST'_A$ represents a final subscript table $ST_B$ relating said subscripts $\{b_i\}$ to said plurality of final scalarized DO-loops for said second array variable B.

2. The method of claim 1 wherein said first transform operator is a unitary operator $\mathscr{J}$.

3. The method of claim 2 wherein said mapping rule $R_F$ is selected responsive to said array variable function F.

4. The method of claim 3 wherein said source program conforms to the Fortran 90 programming language standard.

5. The method of claim 1 wherein said mapping rule $R_F$ is selected responsive to said array variable function F.

6. A computer-implemented compiling system for translating a source program into executable object code, wherein said source program includes one or more array variable transform functions F each providing in one or more enclosing DO-loops a transformation of a first array variable A having one or more subscripts $\{a_i\}$ into a second array variable B having one or more subscripts $\{b_i\}$, wherein i is a non-zero positive integer, said compiling system comprising:

memory means for storing said source program and said executable object code;

parser means coupled to said memory means for detecting each said array variable transform function F operating on said first array variable A in said source program;

scalarizer means coupled to said parser means for identifying said one or more enclosing DO-loops implied by said each array variable transform function F;

correlator means coupled to said scalarizer means for creating a subscript table $ST_A$ relating said one or more enclosing DO-loops to said subscripts $\{a_i\}$ for said first array variable A within said each array variable transform function F;

first transform means for transforming said subscript table $ST_A$ according to a first transform operator to create a subscript map $SM_A$ relating said enclosing DO-loops to a plurality of final scalarized DO-loops;

second transform means coupled to said first transform means for transforming said subscript map $SM_A$ according to a mapping rule $R_F$ to create a new subscript map $SM'_A$; and combining means coupled to said second transform means and said scalarizer means for combining said new subscript map $SM'_A$ and said subscript table $ST_A$ to create a new subscript table $ST'_A$ relating said subscripts $\{a_i\}$ to said plurality of final scalarized DO-loops, wherein said new subscript table $ST'_A$ represents a final subscript table $ST_B$ relating said subscripts $\{b_i\}$ for said second array variable B to said plurality of final scalarized DO-loops.

7. The computer-implemented compiling system of claim 6 wherein said first transform operator is a unitary operator $\mathscr{J}$.

8. The computer-implemented compiling system of claim 7 wherein said mapping rule $R_F$ is selected in response to said array variable function F.

9. The computer-implemented compiling system of claim 8 wherein said source program conforms to a Fortran 90 programming language standard.

10. The computer-implemented compiling system of claim 6 wherein said source program conforms to a Fortran 90 programming language standard.

* * * * *